Dec. 16, 1958 W. B. SEIDEL 2,864,622
MAGNETIC WORK CHUCK
Filed Nov. 26, 1956
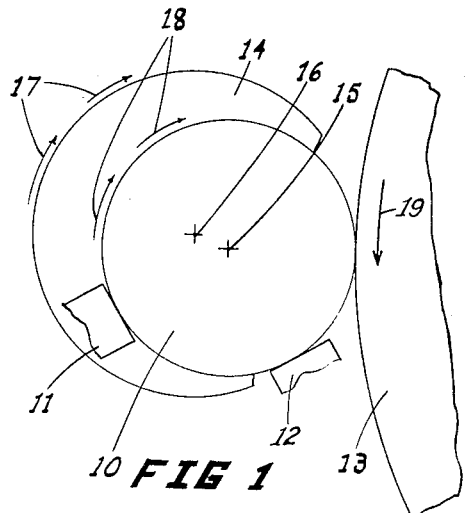
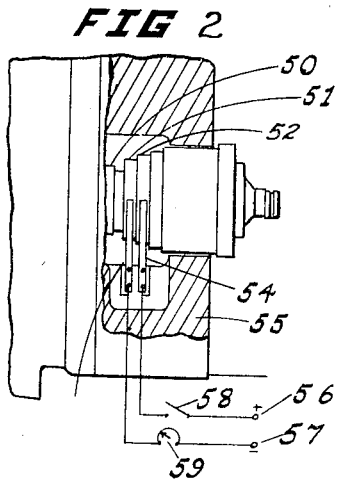
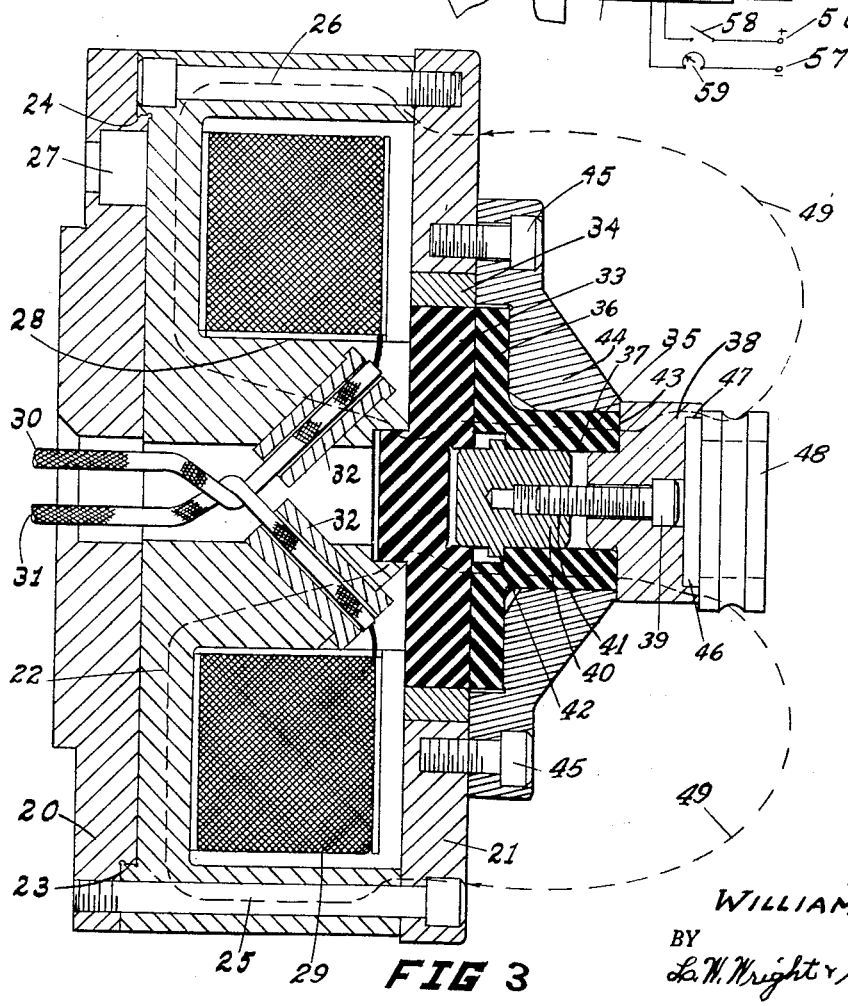
INVENTOR.
WILLIAM B. SEIDEL
BY
L. W. Wright & H. T. Keiser,
ATTORNEYS

2,864,622

MAGNETIC WORK CHUCK

William B. Seidel, Cincinnati, Ohio, assignor to The Cincinnati Milling Machine Co., Cincinnati, Ohio, a corporation of Ohio Application November 26, 1956, Serial No. 624,281

6 Claims. (Cl. 279—1)

The invention relates to work driving mechanisms and more particularly to improvements in a magnetic work chuck driver.

In certain types of machine tools and especially in grinding machines of the type disclosed in U. S. Patent 2,478,607, issued August 9, 1949, it is desirable to provide means for positively rotating the work while permitting limited lateral movement of the work axis relative to the axis of the driving means. The reason for this is that the work is supported on its periphery independent of the driving means, and during grinding of the periphery. Since fixed shoes engage spaced points on the underside of the work to support it, it is obvious that as the work gets smaller, its axis shifts. This necessitates the use of a flat driving plate on which the work can shift, and the problem is to hold the work against the plate in such a manner as to permit lateral shifting thereof but at the same time to impart rotation to the work. Since the periphery of the work must be held against the fixed shoes, if the shoes locate the work at the start eccentric to the axis of the work driving means and on the underside thereof, the driving plate performs the dual function of imparting rotation to the work and at the same time holding the work against the locating shoes.

One of the objects of this invention is to provide an improved magnetic chuck or work driver which is more efficient in directing the magnetic flux through the work and thereby improve the work holding ability of the chuck.

Another object of this invention is to provide improved means for shielding the work holding pole piece of a magnetic chuck to minimize magnetic losses therefrom and strengthen the work holding magnetic field.

Yet another object of the present invention is to provide a magnetic chuck for small workpieces with a maximum area for magnetic contact with the workpiece Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a schematic view showing the relationship between the work, the grinding wheel and the chuck.

Figure 2 is a section through the work holding chuck.

Figure 3 is a diagram of an electrical control circuit for the chuck.

In certain types of machine tools, such as precision grinding machines of the types shown in the aforesaid patent, the work is supported, as shown in Figure 1, with its periphery in engagement with a pair of work locating abutments 11 and 12. The grinding wheel is indicated by the reference numeral 13 and the work driving chuck by the reference numeral 14. The reference numeral 15 indicates the center of the workpiece 10 and the reference numeral 16 indicates the center of rotation of the chuck 14. It will be noted that the abutments 11 and 12 are of opposite sides of the center of gravity of the workpiece 10 which is located at 15. It will now be seen that if the chuck 14 is rotated in the direction of the arrows 17, and if the work is held in gripping contact with the chuck 14 that it will impart rotation to the workpiece 10 in the direction of arrows 18.

If the grinding wheel 13 is rotated in the direction of the arrow 19 it will tend to exert a downward thrust on the workpiece 10 against the abutments 11 and 12, and since if the center of the work is eccentric to the center of the work driver 16 and in the direction of the abutments 11 and 12, the work driver will also develop forces which will urge the work 15 against the abutments 11 and 12. In this sort of grinding, as the periphery of the workpiece 10 is ground away, the workpiece becomes smaller in diameter, and thus, to maintain contact with the abutments 11 and 12, the work is being continuously moved or shifted toward these abutments. Due to all of these conditions it will be seen that the center 15 of the workpiece cannot have a fixed position in space relative to the machine and to the work driving axis 16.

If the workpiece is a ring, the total area of contact with the work driver is necessarily limited, and it is through this contact area that magnetic flux must flow to maintain gripping contact with the work. In prior constructions there is much leakage of the magnetic flux through the air and otherwise before it gets to the area of contact and therefore good driving contact is not obtained. In the device of the present invention as shown in Figure 3, leakage losses are held to a minimum, thereby concentrating the flow of magnetic flux through the contact area and thereby providing a firmer grip on the workpiece.

In addition, the magnetic chuck of the present invention has a workholding face of single polarity, thus obviating the need for non-magnetic insulating material to separate face portions of opposite polarity. These non-magnetic fillers substantially diminish the area in contact with the work and, with small workpieces, such as small annular bearing parts, any area of the face plate not utilized to attract the workpiece substantially affects the grasp on the piece. This is because the force with which a workpiece is held on a magnetic chuck depends on both the flux density and the area of the surface of contact between the work and chuck. After the work becomes magnetically saturated and the flux density relatively constant, the magnitude of the holding force will depend almost entirely on the size of the area of contact between the chuck and the work. With small pieces, which readily become magnetically saturated, it is advantageous to maintain the areas of contact between the chuck and the work as large as possible to obtain the maximum holding force.

Referring to Figure 3, the reference numeral 20 indicates a circular supporting or base plate, and the reference numeral 21 indicates a cover plate parallel to the plate 20. Between these plates there is clamped a cup-shaped armature member 22 which has a recess in one face forming a shoulder 23 which engages the periphery of an upstanding boss 24 formed on the plate 20 whereby the armature member is centered on the member 20. The parts are clamped together by bolts 25 which pass through all three members, while additional bolts 26 secure the armature and cover plate together whereby they may be removed as a unit from the base plate 20, while the base plate is secured to a rotating part of the machine by means of suitable bolts or other clamping means passed through the drilled holes 27.

The member 22 has an upstanding or center pole member 28 which is surrounded by a magnetizing coil indicated generally by the reference numeral 29, which has suitable leads 30 and 31 leading therefrom. It will be noted that these leads pass through insulating bushings 32 mounted and located diagonally in the center core 28.

Means are provided for extending the center pole a sufficient distance beyond the magnetic coil to form a work supporting means. This extension must form a magnetic path and so must be formed of magnetic material. In the center of the cover plate 21 is a disc-type member 33 which is insulated from the cap member 21 by an insulating ring member 34 which is made of non-magnetic material. A second member 35 is mounted next to the member 33 and has a laterally extending flange portion 36 for making contact over a large area with the member 33. The member 35 also has a central tubular bore 37 in the end of which is mounted the magnetic or work supporting plate 38. The part 38 is secured to the member 35 by means of a threaded bolt 39 and a plug member 40 which has a threaded hole 41 into which the bolt 39 is threaded, and by means of a flange 42 formed on the end of the plug 40 and the shoulder 43 formed on the member 38 it is possible to tighten the bolt 39 and clamp the parts to opposite ends of the member 35.

The central pole assembly comprising the parts 33, 35, and 38 are secured in position by a non-magnetic cover plate 44 which fits over the part 35 and overlaps the insulating ring 34, and is secured to the plate 21 by means of screws or the like 45.

The face plate 38 is counterbored at 46, thereby forming an annular face 47 against which the workpiece, such as the annular workpiece 48, is held by magnetic force. By counterboring the face of the work supporting member 38 the magnetic lines of force through the central pole assembly comprising the parts 33, 35, and 38 are concentrated to flow through the annular surface 47 into the workpiece 48 whereby they return through the air to the other pole of the magnet represented by the annular ring 21 through paths indicated by the reference numeral 49.

The wide cover plate 44 and the magnetic insulating ring 34 serve as shielding means to prevent magnetic leakage from the member 35 to the pole piece 21 and thereby concentrate the magnetic flow through the workpiece and thus insure a stronger magnetic force for holding the workpiece against the work support 38. This makes an ideal arrangement for ringlike workpieces for holding them against the work support with sufficient force to impart rotation thereto while, at the same time, permitting lateral movement of the workpiece with respect to the face 47. It will, of course, be understood that the shape of the end face of the work support may be changed to suit the shape of the work being ground if necessary.

Since the base plate 20 is attached to a rotatable spindle 50 or the like, as indicated in Figure 2, for rotation therewith, the electrical leads 30 and 31 from the magnet are attached to armature rings 51 and 52 which are rotatable with the spindle. Electrical brushes 53 and 54 attached to a fixed part of the machine 55 ride on the armature rings and are connected to a source of electricity indicated by the reference numerals 56 and 57 by a control switch 58 and a suitable speed control rheostat 59.

There has thus been provided an improved magnetic chuck having a central pole piece of one polarity surrounded by a second pole piece of opposite polarity and in which means are provided for insulating one from the other to prevent magnetic leakage between them so that the magnetic force will not be dissipated before it reaches the workpiece.

What is claimed is:

1. A magnetic chuck for attachment to a rotatable driver comprising a base plate having an axis of rotation, means on the base plate forming an electromagnet having a center magnetic pole lying on said axis, and an annular magnetic pole face surrounding said center pole in spaced relation thereto, means to magnetize said poles to opposite polarity, a circular cover plate attached to said annular pole face and having a central opening exposing said center pole, a pole assembly attached to the end of said center pole and extending through said opening, non-magnetic means mounted in said opening for isulating the center pole from said cover plate, said pole assembly extending axially beyond said cover plate and terminating in a single pole face plate of opposite polarity to said annular magnetic pole face against which work is to be held by magnetic force, and a second cover plate of non-magnetic material enclosing said pole assembly and overlapping said non-magnetic means for attachment to the first cover plate, whereby magnetic flux passing through the pole assembly must pass through said face plate and return through the air exteriorly of said second cover plate to said first cover plate.

2. A magnetic chuck for attachment to a rotatable driver comprising a base plate having an axis of rotation, means on the base plate forming an electro-magnet having a center magnetic pole lying on said axis, and an annular magnetic pole face surrounding said center pole in spaced relation thereto, means to magnetize said poles to opposite polarity, a circular cover plate attached to said annular pole face and having a central opening exposing said center pole, a pole assembly attached to the end of said center pole and extending through said opening, non-magnetic means mounted in said opening for insulating the center pole from said cover plate, said center pole extending axially beyond said cover plate and terminating in a single pole face plate of opposite polarity to said annular magnetic pole face, and a second cover plate of non-magnetic material enclosing said pole assembly and overlapping said non-magnetic means for attachment to the first cover plate, whereby magnetic flux passing through the pole assembly must pass through said face plate and return through the air exteriorly of said second cover plate to said first cover plate, said face plate having a countersunk central portion forming an annular magnetic work receiving face concentric to its axis of rotation.

3. A magnetic chuck driver for rotating a small workpiece comprising a coil, a member received within the coil, means to energize the coil to establish magnetic poles of opposite polarity on said member, a work receiving face plate, and means connecting the work receiving face plate to said member at one of said poles to define a flux path of magnetic material therebetween spaced from the other of said poles on the member and to establish a single magnetic pole on the work receiving face plate.

4. A magnetic chuck driver for rotating a small workpiece comprising a coil, a cup-shaped member having a portion surrounding the coil and a central upstanding portion spaced therefrom and received within the coil, means to energize the coil to establish magnetic poles of opposite polarity on one end of the central portion and the portion surrounding the coil, respectively, a work receiving face plate, and means connecting the work receiving face plate to the one end of the central upstanding portion of the cup-shaped member to define a flux path of magnetic material therebetween spaced from the portion of the cup-shaped member surrounding the coil and to establish a single magnetic pole on the work receiving face plate of opposite polarity to the portion of the cup-shaped member surrounding the coil.

5. A magnetic chuck driver for rotating a small annular workpiece comprising a coil, a cup-shaped member having a portion surrounding the coil and a central upstanding portion spaced therefrom and received within the coil, means to energize the coil to establish magnetic poles of opposite polarity on one end of the central portion and the portion surrounding the coil, respectively, a work receiving plate having an annular face, and means connecting the work receiving plate to the one end of the central upstanding portion of the cup-shaped member to define a flux path of magnetic material between the annular face and said one end of the central member spaced from the portion of the cup-shaped member surrounding the coil and thereby establish a single magnetic pole on the annular face of the work receiving plate of opposite polarity to the portion of the cup-shaped member surrounding the coil.

6. A magnetic chuck driver for rotating a small workpiece comprising a coil, a cup-shaped member having a portion surrounding the coil and a central upstanding portion spaced therefrom and received within the coil, means to energize the coil to establish magnetic poles of opposite polarity on one end of the central portion and the portion surrounding the coil, respectively, a cover plate of magnetic material connected to the portion of the cup-shaped member surrounding the coil and having a central opening therein, a work receiving face plate, and means connecting the work receiving face plate to the one end of the central upstanding portion of the cup-shaped member to define a flux path of magnetic material therebetween passing through the central opening in the cover plate and spaced from said cover plate and thereby establish a single magnetic pole on the work receiving face plate of opposite polarity to the portion of the cup-shaped member surrounding the coil.

References Cited in the file of this patent

UNITED STATES PATENTS

| | | |
|---|---|---|
| 1,523,770 | Hanson | Jan. 20, 1925 |
| 2,741,481 | Ortegren | Apr. 10, 1956 |
| 2,769,642 | Berry | Nov. 6, 1956 |